H. B. Spedden,
Plow Gage.
No. 93,362.   Patented Aug. 3, 1869.
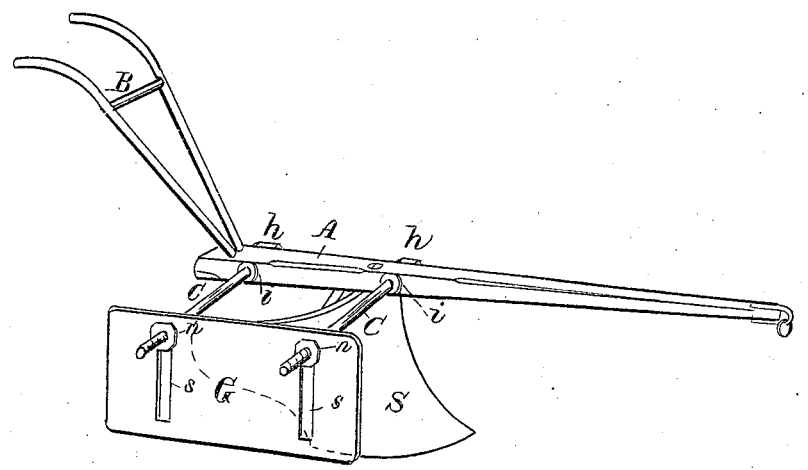
Witnesses
A. C. Bradley
A. T. Langston
Hugh B. Spedden
By his Attorney
Chas. F. Ransbury

UNITED STATES PATENT OFFICE.

HUGH B. SPEDDEN, OF BALTIMORE, MARYLAND, ASSIGNOR TO HIMSELF, WILLIAM H. BALTZEL, AND G. A. MOORE, OF SAME PLACE.

IMPROVEMENT IN PLOW-GAGES.

Specification forming part of Letters Patent No. 93,362, dated August 3, 1869.

*To all whom it may concern:*

Be it known that I, HUGH B. SPEDDEN, of the city and county of Baltimore, in the State of Maryland, have invented a new and useful Plow-Gage; and I do hereby declare the following to be a full and correct description of the same, reference being had to the accompanying drawing, in which—

Figure 1 is a perspective view of a plow with a gage attached.

My invention consists in the attachment to a plow, in the manner hereinafter described, of a gage, by which the amount of earth thrown to a growing crop by plow-cultivation can be perfectly under the control of the husbandman, thus dispensing with the employment of those hands whose work now is to uncover the young plants and remove the superabundance of earth thrown on the crops by the plows of ordinary construction.

In the accompanying drawing, A marks the beam of the plow; B, the handles, and S the share. Two iron rods, C C, pass through and are firmly attached to the beam A. They are prevented from moving longitudinally by their heads $h\ h$ and the nuts $i\ i$, which work on threads on the rods, and are tightly screwed up against the side of the beam, as shown.

G marks the gage, which is a flat plate, of iron or steel, oblong in form, and of a size proportioned to that of the plow to which it is attached. Two vertical slots, $s\ s$, are made in the gage, to receive the ends of rods C C, so that the height of the gage can be regulated at will.

The gage is fixed on the rods C C at any required distance from the plow-beam, by means of nuts $n$, two on each rod, one on each side of the plate G.

What I claim, and desire to secure by Letters Patent, is—

The slotted plate G, connected with the plow-beam by the rods C C, and adjusted horizontally and vertically by the nuts $n\ n$, in the manner and for the purpose described.

The above specification of my said invention signed and witnessed at Baltimore, this 29th day of April, A. D. 1869.

HUGH B. SPEDDEN.

Witnesses:
A. H. PENINGTON,
N. M. BOSLEY.